(12) United States Patent
Taoka et al.

(10) Patent No.: US 8,475,272 B2
(45) Date of Patent: Jul. 2, 2013

(54) GAME PROGRAM, STORAGE MEDIUM, GAME DEVICE AND GAME SYSTEM

(75) Inventors: Jiro Taoka, Osaka (JP); Takaaki Yamanouchi, Osaka (JP)

(73) Assignee: Capcom Co., Ltd., Osaka (JP)

( * ) Notice: Subject to any disclaimer, the term of this patent is extended or adjusted under 35 U.S.C. 154(b) by 0 days.

(21) Appl. No.: 13/422,678

(22) Filed: Mar. 16, 2012

(65) Prior Publication Data

US 2012/0184376 A1   Jul. 19, 2012

Related U.S. Application Data

(63) Continuation of application No. 12/995,098, filed on Nov. 29, 2010.

(30) Foreign Application Priority Data

May 30, 2008   (JP) ................................ 2008-142189
May 28, 2009   (JP) ................................ 2010-514377

(51) Int. Cl.
| | |
|---|---|
| *A63F 9/24* | (2006.01) |
| *A63F 13/00* | (2006.01) |
| *G06F 17/00* | (2006.01) |
| *G06F 19/00* | (2006.01) |

(52) U.S. Cl.
USPC .............. 463/31; 463/1; 463/2; 463/7; 463/8; 463/29; 463/30; 463/32; 463/33; 463/36; 463/37; 463/38; 463/42; 463/43; 463/44; 345/4

(58) Field of Classification Search
USPC ............. 463/1, 2, 7, 8, 29–33, 36–38, 42–44; 273/460, 461, 141; 345/4
See application file for complete search history.

(56) References Cited

U.S. PATENT DOCUMENTS

| | | | |
|---|---|---|---|
| 6,585,599 B1* | 7/2003 | Horigami et al. ................ | 463/43 |
| 7,722,467 B2* | 5/2010 | Tabata ............................. | 463/42 |

(Continued)

FOREIGN PATENT DOCUMENTS

| | | |
|---|---|---|
| JP | 11-076611 A | 3/1999 |
| JP | 11-300045 A | 11/1999 |

(Continued)

OTHER PUBLICATIONS

"Senjo no Valkyria", DENGEKI PlayStation, Apr. 25, 2008, vol. 14, No. 19, whole No. 433, pp. 82 and 89 (partial translation enclosed).

(Continued)

*Primary Examiner* — Omkar Deodhar
*Assistant Examiner* — Adetokunbo O Torimiro
(74) *Attorney, Agent, or Firm* — Posz Law Group, PLC

(57) ABSTRACT

In a game program for a multiplayer game, when a player character receives damage and the strength level reaches a certain level, the player character goes into an extension state before death, in which the character is weakened but is able to recover. If a friendly player character performs a recovery action within a certain time from the weakened state having been reached, the player character in the weakened state recovers to a normal state. On the other hand, if the player character in the weakened state is attacked by an enemy character, or if the certain time has elapsed, the player character in the weakened state is caused to die and the game is ended.

8 Claims, 13 Drawing Sheets

U.S. PATENT DOCUMENTS

| | | | |
|---|---|---|---|
| 2004/0166914 A1* | 8/2004 | Ishihata et al. | 463/2 |
| 2004/0254004 A1* | 12/2004 | Kojima et al. | 463/1 |
| 2007/0026944 A1* | 2/2007 | Maehiro et al. | 463/31 |

FOREIGN PATENT DOCUMENTS

| | | |
|---|---|---|
| JP | 2000-308759 A | 11/2000 |
| JP | 2004-329709 A | 11/2004 |
| JP | 2007-075431 A | 3/2007 |
| JP | 2008-073260 A | 4/2008 |
| WO | WO 02/47780 A1 | 6/2002 |

OTHER PUBLICATIONS

"Dragon Shadow Spell Official Saisoku Guidebook," 1st Edition, Enterbrain, Inc., Jan. 30, 2007, pp. 42 and 43, ISBN978-4-7577-3340-4 (partial translation enclosed).

"CAPCOM Kanpeki Koryaku Series 58 Biohazard 4 Clear Navigation Book", 1st Edition, Capcom Co., Ltd., Dec. 10, 2005, p. 18, ISBN4-575-16450-X (partial translation enclosed).

"Monster Hunter Portable 2nd Official Guidebook," Enterbrain, Inc., Jul. 18, 2007, p. 34 (Discussed on p. 1 of the specification; partial English translation enclosed).

International Search Report mailed on Jun. 30, 2009 for the corresponding International patent application No. PCT/JP2009/002363 (English translation enclosed).

Office Action dated Dec. 13, 2010 issued in corresponding JP application No. 2010-514377 (English translation attached).

* cited by examiner

GAME PROGRAM, STORAGE MEDIUM, GAME DEVICE AND GAME SYSTEM

CROSS REFERENCE TO RELATED APPLICATIONS

This application is a continuation of U.S. application Ser. No. 12/995,098 filed on Nov. 29, 2010, which is based on and claims priority to Japanese Patent Application Nos. 2008-142189 filed on May 30, 2008, 2010-514377 filed on May 28, 2009, the disclosures of which are incorporated herein by reference.

This application is also related to the following continuation applications that were filed on the same day as the present application: U.S. application Nos. 13/422,866 and 13/422,804, both entitled GAME PROGRAM, STORAGE MEDIUM, GAME DEVICE AND GAME SYSTEM.

INDUSTRIAL FIELD OF THE INVENTION

The present invention relates to a game program that executes a game, such as an action game, in which a player character controlled by a user fights against enemy characters, a storage medium, a game device and a game system.

BACKGROUND OF THE INVENTION

There have been multi-player games, in which multiple player characters appear in the game and cooperatively progress the story. Such multi-player games are divided into a type, in which player characters are controlled by multiple controllers connected to a single game machine, and a type, in which multiple game machines are mutually connected via a network and player characters are controlled by the multiple game machines.

In such multi-player games, there is a game where a player character is caused to die, the player character is removed from the game, and the game proceeds with the remaining player characters. Alternatively, there is another game that ends (game is over) when one player character is caused to die, and the game must be played by all players from the beginning of the game or resumed from a saved point. An online action game called "MONSTER HUNTER" (trademark) is an example of the latter game (Non-Patent Document 1).

Non-Patent Document 1: "Monster Hunter Portable 2nd Official Guidebook," Enterbrain, Inc., Jul. 18, 2007, p. 34.

DISCLOSURE OF THE INVENTION

Problems Solved by the Invention

In the game that ends when one player character is caused to die as discussed above, because the game ends when a player character of any user is caused to die, the progress of the game depends on the player with the lowest skills. That is, because the player character with the lowest skill is the most likely to die, the game likely ends when such a player character is caused to die.

Therefore, the game progress depends on a lower skilled user even if there are higher skilled users in the plurality of users. Accordingly, there is a problem that the higher skilled users lose interest in the game because they cannot make the most of their skills.

The present invention has an object to provide a game program, a storage medium, a game device and a game system for a multi-player game, in which the game is prevented as far as possible from being ended by a death of a player character of a less skilled user and in which the game progress is largely unaffected by the less skilled user.

Problem Resolution Means

A game program provided by the first aspect of the present invention drives a computer to function as: a game space control unit for generating a virtual game space; and a player object control unit for generating a player object operated by a user and for causing the player object to perform an activity in the game space based on operational information, wherein a plurality of the player object control units is provided to cause a plurality of player objects to perform activities in the game space, and each of the player object control units includes: a unit for storing an activity ability value that indicates activity ability of a corresponding player object; an activity ability value control unit for reducing the activity ability value when the corresponding player object receives damage; a unit for maintaining the activities by the corresponding player object for a predetermined recoverable time in a recovery wait state and for accepting a predetermined recovery action by another player object during the recoverable time when the activity ability value of the corresponding player object is reduced to a predetermined value; and a unit for causing the corresponding player object to enter an activity inability state when the recovery action is not received from the another player object within the recoverable time.

In a preferred embodiment of the present invention, the computer is driven to further function as an enemy object control unit for generating an enemy object that attacks the player object and for causing the enemy object to perform activities in the game space, and the activity ability value control unit includes a unit for reducing the activity ability value when the corresponding player object receives an attack from the enemy object.

In a preferred embodiment of the present invention, the enemy object control unit controls the enemy object so that the enemy object does not attack the player object in the recovery wait state during either a part of or an entirety of the recoverable time.

In a preferred embodiment of the present invention, the plurality of the player object control units performs a process to end the game when a predetermined number of the plurality of player objects enters the activity inability state, the predetermined number being less than the total number of the plurality of player objects.

In a preferred embodiment of the present invention, the plurality of the player object control units performs a process to end the game when all of the plurality of player objects enter the activity inability state or the recover wait state.

In a preferred embodiment of the present invention, the player object control unit prohibits activities, excluding movement, based on the operational information when the corresponding player object is in the recovery wait state.

In a preferred embodiment of the present invention, the player object control unit causes the corresponding player object to enter the activity inability state when the corresponding player object receives an additional damage in the recovery wait state, regardless of the recoverable time.

In a preferred embodiment of the present invention, the player object control unit reduces a remainder of the recoverable time by a predetermined amount when the corresponding player object receives additional damage in the recovery wait state.

In a preferred embodiment of the present invention, when the corresponding player object receives a recovery action from another player object in the recovery wait state, the player object control unit sets a remainder of the recoverable time at that time as the predetermined recoverable time for a subsequent recovery wait state.

In a preferred embodiment of the present invention, the player object control unit sets the predetermined recoverable time for the subsequent recovery wait state as a preset maximum recoverable time when the corresponding player object in the recovery wait state has received a recovery action including a specific action from another player object.

In a preferred embodiment of the present invention, the computer is driven to further function as one or a plurality of game image drawing units for generating one or a plurality of the game images corresponding to a part of or the entire plurality of player objects, and each of the game image drawing units includes a unit for generating an image of the game space including the corresponding player object and generates an exclusive game image that is different from a normal game image when the corresponding player object enters the recovery wait state.

In a preferred embodiment of the present invention, the computer is driven to further function as one or a plurality of the game image drawing a unit for generating one or a plurality of the game images corresponding a part of or the entire plurality of player objects, and each of the game image drawing units includes a unit for generating a gauge that displays an activity ability value of another player object and for changing a display format of the gauge of the another player object when the another player object enters the recovery wait state.

In a preferred embodiment of the present invention, the computer is driven to further function as one or a plurality of game image drawing units for generating one or a plurality of game images corresponding a part of or the entire plurality of player objects, and each of the game image drawing units includes a unit for generating an image of the game space including the corresponding player object and for generating a figure indicating a direction of a location of the another player object in the image of the game space when the another player object enters the recovery wait state.

A computer readable storage medium provided by the second aspect of the present invention includes a game program recorded therein, the game program causing a computer to function as: a game space control unit for generating a virtual game space; and a player object control unit for generating a player object operated by a user and for causing the player object to perform an activity in the game space based on operational information, wherein a plurality of the player object control units is provided to cause a plurality of the player objects to perform activities in the game space, and each of the player object control units includes: a unit for storing an activity ability value that indicates activity ability of a corresponding player object; an activity ability value control unit for reducing the activity ability value when the corresponding player object receives damage; a unit for maintaining the activities by the corresponding player object for a predetermined recoverable time in a recovery wait state and for accepting a predetermined recovery action by another player object during the recoverable time when the activity ability value of the corresponding player object is reduced to a predetermined value; and a unit for causing the corresponding player object to enter an activity inability state when the recovery action is not received from another player object within the recoverable time.

A game device provided by the third aspect of the present invention includes a game space control unit for generating a virtual game space; and a player object control unit for generating a player object operated by a user and for causing the player object to perform an activity in the game space based on operational information, wherein a plurality of the player object control units is provided to cause a plurality of the player objects to perform activities in the game space, and each of the player object control units includes: a unit for storing an activity ability value that indicates activity ability of a corresponding player object; an activity ability value control unit for reducing the activity ability value when the corresponding player object receives damage; a unit for maintaining the activities by the corresponding player object for a predetermined recoverable time in a recovery wait state and for accepting a predetermined recovery action by another player object during the recoverable time when the activity ability value of the corresponding player object is reduced to a predetermined value; and a unit for causing the corresponding player object to enter an activity inability state when the recovery action is not received from another player object within the recoverable time.

A game system provided by the fourth aspect of the present invention includes a plurality of game devices being connected to each other through a network, each of the game devices including: a game space control unit for generating a virtual game space; and a player object control unit for generating a player object operated by a user and for causing the player object to perform an activity in the game space based on operational information, wherein a plurality of the player object control units is provided to cause a plurality of the player objects to perform activities in the game space, each of the player object control units includes: a unit for storing an activity ability value that indicates activity ability of a corresponding player object; an activity ability value control unit for reducing the activity ability value when the corresponding player object receives damage; a unit for maintaining the activities by the corresponding player object for a predetermined recoverable time in a recovery wait state and for accepting a predetermined recovery action by another player object during the recoverable time when the activity ability value of the corresponding player object is reduced to a predetermined value; and a unit for causing the corresponding player object to enter an activity inability state when the recovery action is not received from another player object within the recoverable time, each of the game devices further includes: an operation unit for inputting operational information from a user; and a communication unit for transmitting the operational information outputted from the operation unit to the another game device and for receiving operational information from another game device through the network, and the player object control unit of the game device each causes the plurality of player objects to perform activities in the game space based on the operational information outputted from the operation unit and the operational information received from the another game device.

Advantages of the Invention

According to the present invention, a game program is provided that relates to a multi-player action game, in which the game is not immediately terminated even when an activity ability value of a player object becomes zero, and in which the game progress is hardly affected by the skill of a single users.

In addition, even when the activity ability value of the player object of the less skilled user becomes zero, other player objects can recover such player object. Therefore, mutual cooperation and/or mutual support between the player objects may be established in the multi-player game. Thereby, the more skilled users can affect the game progress.

DESCRIPTION OF SYMBOLS

Figure 1:
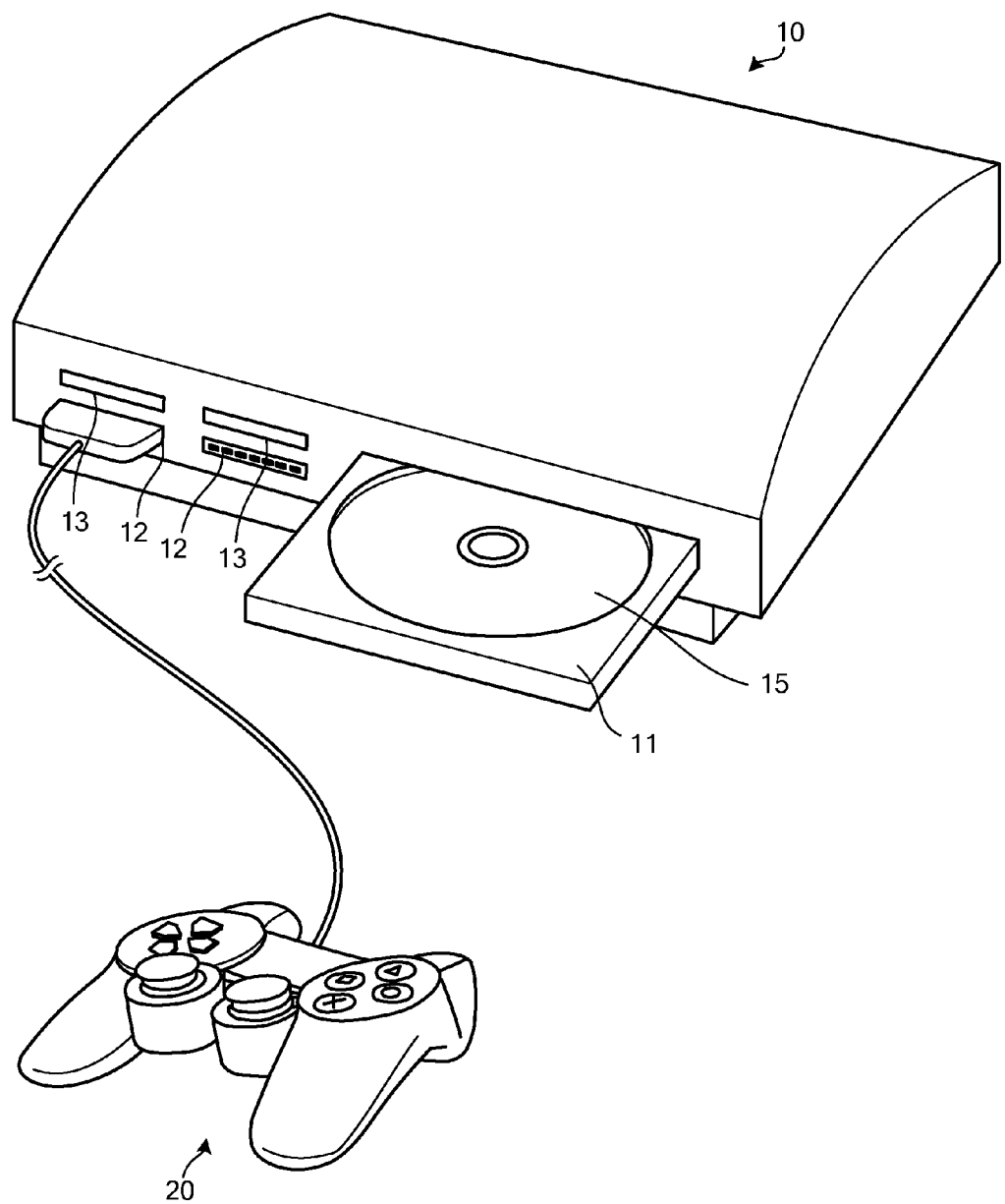
FIG. 1 illustrates an outer view of a video game machine, to which the present invention is utilized.

50 Operation detection part
51 Game progress control part
52 Player character control part
53 Enemy character control part
54 Player character A control part
55 Player character B control part
56 Game space control part
57 Drawing processing part
58 Player character A image drawing part
59 Gauge drawing part
60 Image synthesizing part
61 Player character B image drawing part
62 Gauge drawing part
63 Image synthesizing part
101 Player character A
102 Player character B
110 Enemy character (zombie)
121, 122 Hit point gauge
125 Guide arrow

EMBODIMENTS FOR IMPLEMENTING THE INVENTION

A game program and a game device, which are embodiments of the present invention, are explained with reference to the drawings.

First, a video game machine, on which a game program is executed, is explained. FIG. 1 is an outer view of the video game machine (computer), on which the game program is executed.

The video game machine is configured with a controller 20 connected to a game machine main body 10. The controller 20 is operated by a user. The user controls a player character or the like that appears in the game using the controller 20. The game progresses by executing a process corresponding to the user's operation on a game device formed by the game program and the video game machine. The game may be discussed in the below explanations with the player character as the subject and with the movement of the player character.

The game machine main body 10 includes a tray 11, to which a recording medium (storage medium) 15, in which a game program is recorded, is set. The recording medium 15 is a digital versatile disc (DVD), for example. The game machine main body 10 reads out a game program from the recording medium 15 and executes the program. The recording medium 15 may not be a DVD but may be a compact disc (CD), a BLU-RAY DISC (registered trademark), or an internal hard disk.

Two connectors 12, to which the controller 20 is connected, are provided on a front surface of the device. Two memory slots 13, to which an external memory 45 (see FIG. 2) is set, also are provided on the front surface of the device. The external memory 45 is a card-shaped storage medium, which has a flash memory therein.

The controller 20 has an approximately U shape and is operated as the user holds wing handles by both ends. On the upper surface of the left and right sides of the controller 20, control buttons and analog sticks are provided as a control unit group. By operating these control buttons and analog sticks, the player characters and camera positions are controlled. In response to the operations of these by the user, the player character in the game performs motions, such as walking, holding a gun and turning.

Figure 2:
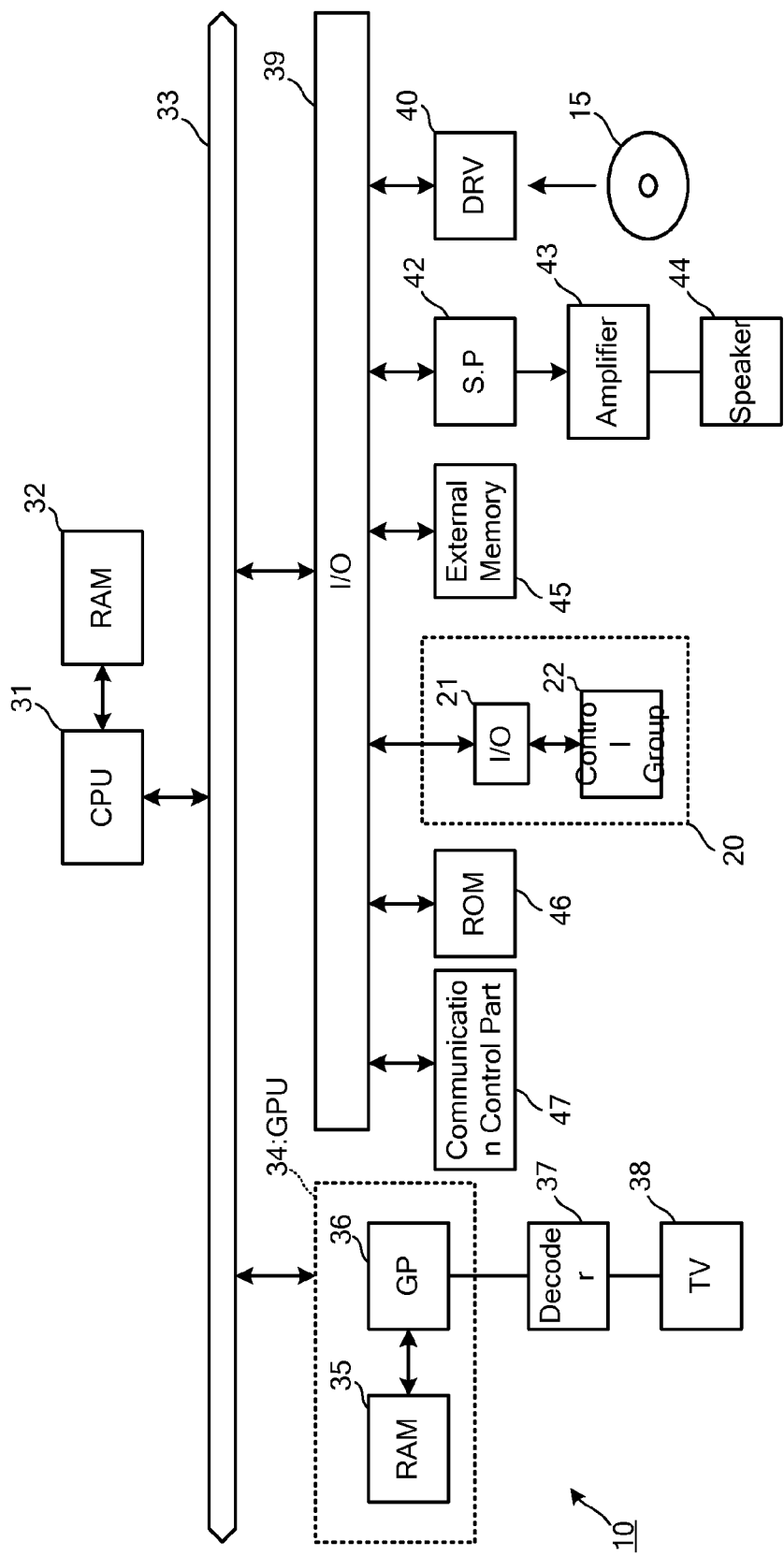
FIG. 2 illustrates a block diagram of the video game machine.

FIG. 2 is a block diagram showing an internal structure of the game machine main body 10 and the controller 20.

The game machine main body 10 includes a central processing unit (CPU) 31 that controls the operation of the entire device. A random access memory (RAM) 32 and a bus 33 are connected to the CPU 31. Various data is stored in the RAM 32 in response to the game progress.

To the bus 33, a graphic processor unit (GPU) 34 and an input/output (I/O) port 39 are connected. To the GPU 34, an external monitor (television device; TV) 38 is connected via a decoder 37 for converting digital image signals into a NTSC or PAL television format.

To the I/O port 39, a driver (DRV) 40 for reproducing and decoding data recorded in the recording medium 15, such as an optical disk, a sound processor (SP) 42, an external memory 45, the controller 20, a read only memory (ROM) 46 and a communication control part 47 are connected.

The control unit group 22 on the controller 20 are connected to the I/O port 39 of the game machine main body 10 via an I/O port 21. The communication control part 47 communicates with other game devices through a network, such as the Internet. The communication control part 47 transmits operational information outputted from the control unit group 22 of the controller 20 to the other game devices, and receives information such as operational information outputted from the controller of the other devices.

A system program is stored in the ROM 46 for starting the game machine main body 10 and executing basic functions. User information, an intermediate status of the game being executed or the like is stored in the external memory 45. As the user sets the recording medium 15, on which the game program is stored, and the external memory 45, the game that had been stopped can be resumed from the stopped timing.

The sound processor 42 is connected to an external speaker 44 via an amplifier 43. The speaker 44 is a speaker integrated with the monitor 38 built in the television device.

Next, the game program executed by the video game machine is explained. The game provided by the game program is an action game, in which each stage is cleared as the player character controlled by the user beats enemy characters in the stage. The game progresses as a plurality of player characters controlled respectively by other users fight against enemy characters, such as zombies and monsters, by using weapons, such as guns and knives. In the below embodiment, a game, in which two player characters (player characters A and B) are controlled by two users, is described as an example. However, the number of the users and/or player characters is not limited to two.

Each player character has a parameter of a hit point. The hit point is a parameter to allow the character's activities. The hit point increases when the player character takes an item that becomes nutritious for the player character and decreases when the player character receives an attack (damage) from an enemy character or is hit by his own attack (e.g., hand grenade) (self-destruction). The player character dies when a certain length of time elapses after the hit point reaches zero. In addition, because there are many points in the game where the two player characters must cooperate with each other in order to pass, the game can no longer progress if one of the player characters is caused to die, and thus, the game ends. The hit point corresponds to an activity ability value of the present invention.

However, in this game, the player character stays alive for a certain length of time after the hit point reaches zero. By receiving a recovery action (treatment) by the other player during this time, the hit point recovers slightly, and the player character can return to the normal activity state. That is, in this game, the player character is not caused to die immediately when the hit point reaches zero. However, an extension period (recoverable period) is provided for a certain length of time, during which the player character can be recovered by an assistance of the other character. A state of the player character during this extension period is called "weakened state." The weakened state corresponds to a recovery wait state of the present invention, and a death of the character corresponds to an activity inability state.

By providing a period of such a weakened state, because a user may realize that a partner's player character is in a weakened state and is able to recover the player character, sudden ending of the game due to the death of the partner's player character can be prevented. Moreover, because the user can prevent the partner's player character from dying by the user's operation, the progress of the game can be controlled based on the user's skill even if the partner's skill is low. Further, closeness between the users can be increased as the users help each other.

The player character in the weakened state can only move slowly (wobble) and cannot perform the recovery activity by himself. In addition, when the partner's play character enters a weakened state, a mark that warns the weakened state of the partner's player character and indicates a location of the partner's player character is displayed on the game screen of the player character controlled by the user. Therefore, the user is quickly able to rescue the partner's player character.

Figure 3:
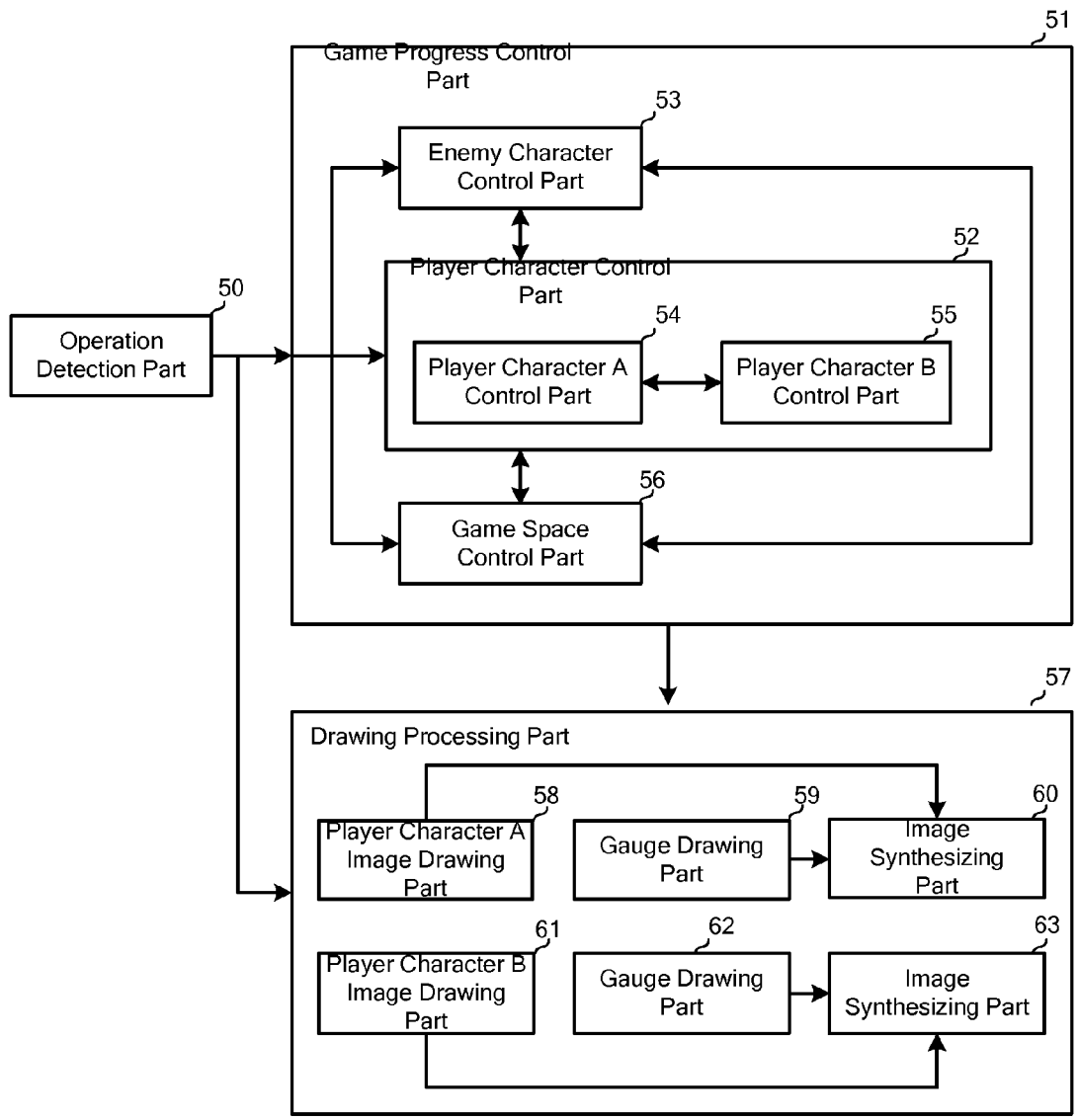
FIG. 3 illustrates a structure of a game device formed by a game program and the video game machine.

The game device that includes functional parts shown in FIG. 3 is configured by reading the game program on the above-described video game machine. The game device includes a operation detection part 50, a game progress control part 51, a player character control part 52, an enemy character control part 53, a game space control part 56, a drawing processing part 57 and the like. The operation detection part 50 includes a data processing part formed from the CPU 31, the RAM 32 and the like, the controller 20 and the communication control part 47. The operation detection part 50 detects various operations by the user and transmits them to the game progress control part 51. The game progress control part 51 includes the data processing part formed from the CPU 31, the RAM 32 and the like. The game progress control part 51 generates a virtual game space and characters and progresses the game by performing processes, such as changing the above-described game space and controlling activities by the characters, in response to the user operation and/or elapsed time.

The game progress control part 51 includes the player character control part 52 that controls activities by the player characters, the enemy character control part 53 that controls activities by enemy characters that fight against the player characters, and the game space control part 56 that generates a three-dimensional game space and controls environments, such as weather. The player character control part 52 controls activates by the player characters based on the operational information outputted from the operation detection part 50. The enemy character control part 53 generates enemy characters in the game space and causes to perform activities (fighting) in response to the activities by the player characters. The game space control part 56 generates a game space of a game stage selected based on the operational information outputted from the operation detection part 50.

The player character control part 52 controls activities of the two player characters in the game and includes a player character A control part 54 that controls activities of the player character A and a player character B control part 55 that controls activities of the player character B. The player character A control part 54 and the player character B control part 55 send and receive data, such as positional coordinates and hit points, to and from each other and consistently obtain information indicating the status of the other character.

The drawing processing part 57 generates an image of the game space, in which the game space, player characters and enemy characters generated by the game progress control part 51 are projected on a two-dimensional screen, and outputs to a monitor. Therefore, the drawing processing part 57 receives activity data of the player character A controlled by the player character A control part 54 and activity data of the player character B controlled by the player character B control part 55 and generates and outputs two game images that are different from each other.

A player character A image drawing part 58 draws an image of a game space viewed from a virtual camera positioned on a rear side of the player character A. A gauge drawing part 59 generates a large gauge that displays a hit point of the player character A and a small gauge that displays a hit point of the player character B. An image synthesizing part 60 synthesizes the large and small gauges generated by the gauge drawing part 59 on a right side edge of the image of the game space drawn by the player character A image drawing part 58. The synthesized image is the game image for the player character A and is displayed on a screen area assigned to the player character A.

Similarly, a player character B image drawing part 61 draws an image of a game space viewed from a virtual camera positioned on a rear side of the player character B. A gauge drawing part 62 generates a large gauge that displays a hit point of the player character B and a small gauge that displays a hit point of the player character A. An image synthesizing part 63 synthesizes the large and small gauges generated by the gauge drawing part 62 on a left side edge of the image of the game space drawn by the player character B image drawing part 61. The synthesized image is the game image for the player character B and is displayed on a screen area assigned to the player character B.

The drawing processing part 57 displays the game image at full screen when only one of a game image of the player character A, in which various gauges and the like are synthesized with the above-described game space viewed from the virtual camera on the rear side of the player character A, and a game image of the player character B, in which various gauges and the like are synthesized with the game space viewed from the virtual camera on the rear side of the player character B. Moreover, when both the game image of the player character A and the game image of the player character B are displayed on a single monitor, the game image of the player character A is displayed in a left upper screen area of the monitor, and the game image of the player character B is displayed in a right lower screen area of the monitor, as shown in FIGS. 5-7.

Figure 4A:
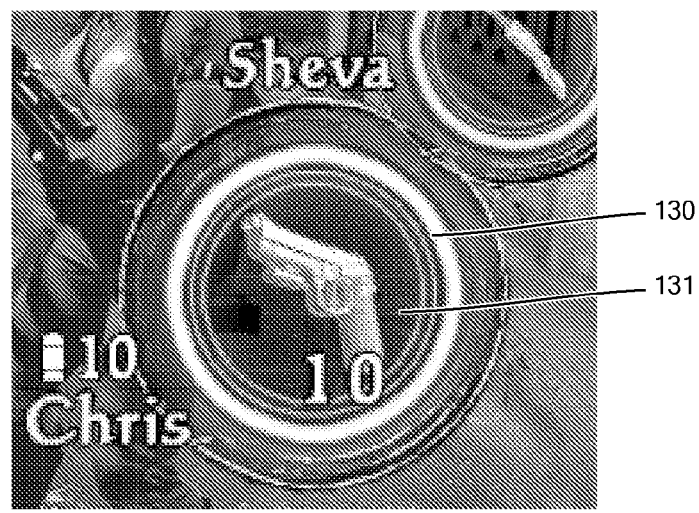
FIGS. 4A-4C illustrate hit point gauges displayed in a game image of the game device.
Figure 4B:
Figure 4C:
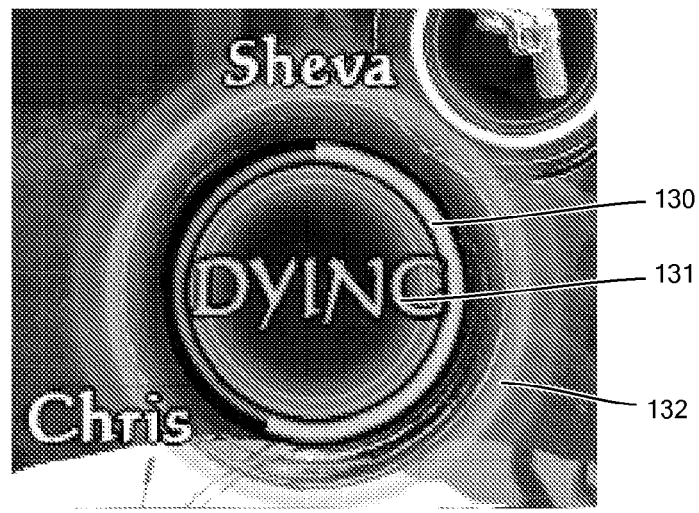

FIGS. 4A-4C illustrate the large and small hit point gauge formed in the game image of a player character. FIG. 4A illustrates a hit point gauge in a normal state. FIGS. 4B and 4C illustrate a hit point gauge displayed in the weakened state. FIG. 4A is an enlarged image of a hit point gauge 121L of a player character A (Chris) shown in FIG. 5A. FIG. 4B is an enlarged image of the hit point gauge 121L of the player character A shown in FIG. 5B. FIG. 4C is an enlarged image of the hit point gauge 121L of the player character A shown in FIG. 6A.

The hit point gauge 121 is a gauge that indicates a hit point by a length of a circular arc bar 130 (center angle of the circular arc). In the normal state, the bar 130 is green and extends in a clockwise direction from the top end (12 o'clock). As shown in FIG. 4A, when the hit point is 100%, the bar 130 extends around (center angle=360°) and is circular. When the hit point decreases, the length of the green bar 130 of the hit point gauge 121 is reduced from the top in a counterclockwise direction. A center of the hit point gauge 121 is an information display part 131, which shows an image of an item equipped by the player character A in the normal state. In this figure, the information display part 131 shows that the player character A is equipped with a pistol loaded with ten bullets.

In the weakened state shown in FIGS. 4B and 4C, the bar 130 becomes red and displays a recovery energy by the length (center angle). FIG. 4B shows the hit point gauge immediately after entering in the weakened state, in which the recovery energy is 100% (30 seconds). In contrast, FIG. 4C shows the hit point gauge after a certain length of time has elapsed after entering the weakened state, in which the recovery energy is reduced nearly by a half. In the weakened state, the information display part 131 displays a word "DYING." Moreover, in the weakened state, a red corona ring 132 is displayed around the hit point gauge 121.

The action game according to the embodiment is explained in further details with reference to the game images shown in FIGS. 5-8. FIGS. 5-8 illustrate game images showing scenes of the action game. FIGS. 5-7 show scenes where the player character A (referenced by 101 in the figures) enters a weakened state due to an attack by an enemy character 110 and is recovered by a recovery action (treatment) by the player character B (referenced by 102 in the figures). In FIGS. 5-7, a game image 70 of the player character A (Chris) and game image 71 of the player character B (Sheva) are displayed side-by-side in a single monitor 38 (game screen). This is a display form for a case, in which two users play the game at the same time by connecting two controllers 20 to a single game machine main body 10. The game images 70 and 71 show images of a virtual camera taking an image of a game space from the rear side of the respective player character and display a hit point gauge and the like therein.

Figure 5A:
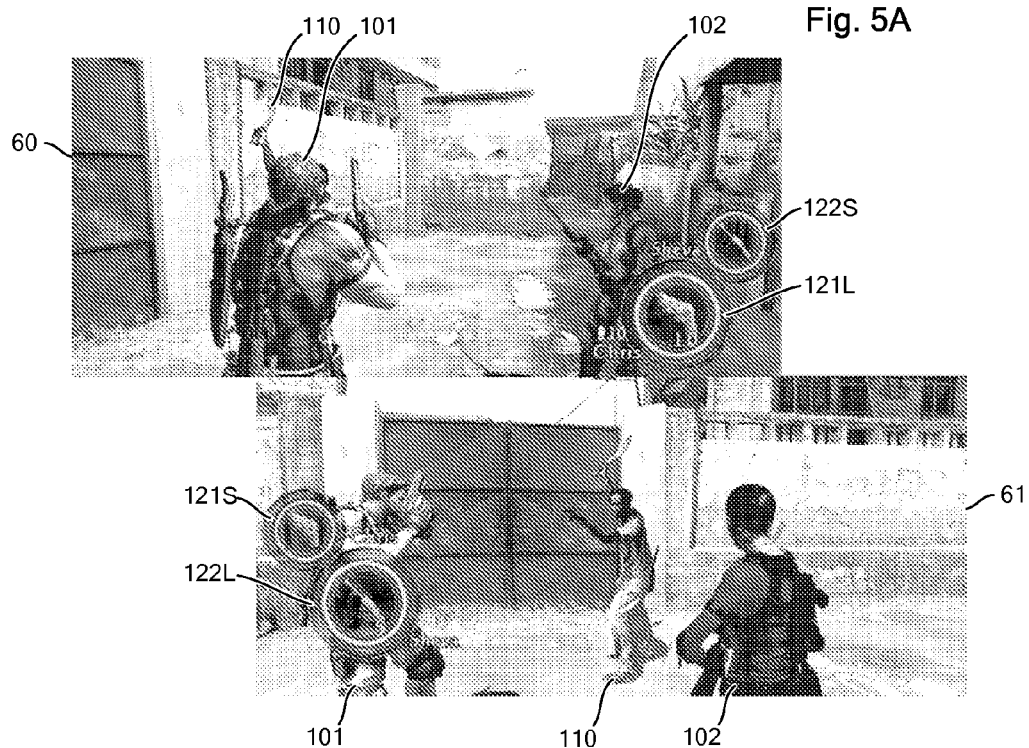
FIGS. 5A and 5B illustrate game images of an action game executed by the game device.

FIG. 5A illustrates a game image, in which a zombie 110, which is an enemy character, is about to attack the player character A. The player character A holds a gun in his hand and prepares for the attack by the zombie 110. The player character B also holds a rifle in her hands and watches the zombie 110 carefully. Because neither player character has received an attack, the hit points of both characters are 100%.

Figure 5B:
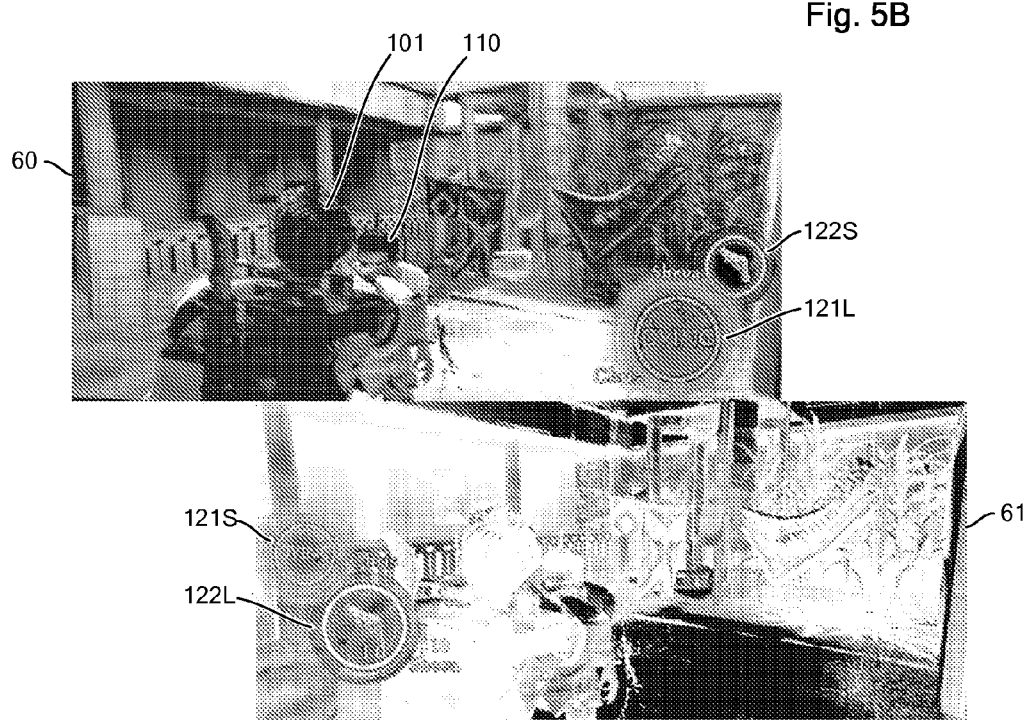

FIG. 5B illustrates a game image of a moment when the hit point of the player character A reached zero after the player character A had received the attack from the zombie 110. The hit point becomes zero if damage that exceeds the remaining hit point at the time of the attack is received from the attack by the enemy character. Then, the player character A enters the weakened state. The bar 130 of the hit point gauge 121L that indicates the hit point of the player character A turns into red from green, and a word "DYING" appears in the information display part 131 in the center.

In contrast, at the moment when the hit point of the player character A reaches zero, the game image 71 of the player character B is processed as discussed below to inform the player character B that the hit point of the player character A has reached zero. A virtual camera image of the game image 71 is momentarily switched to a virtual camera image of the player character A, which is reversed into a negative image (for 1 second or less). At the same time, an arrow 125 that indicates a direction to the player character A from the player character B is displayed. The hit point gauges 121S and 122L, which are displayed in the game image 71, are not reversed into negative images. Of these, for the hit point gauge 121S that indicates the hit point of the player character A, the bar 130 is changed from green to red, and the word "DYING" is displayed in the information display part 131 in the center, similar to the one displayed in the game image 70 for the player character A.

Based on the above-discussed process, the fact that a player character on the team is in a dangerous condition can be quickly informed, and the position of the player character can be notified. In addition, an opportunity is given to the user to treat the player character in danger. Further, by switching the screen suddenly and momentarily, a strong impact is provided, and more intimidating situations can be presented.

Figure 6A:
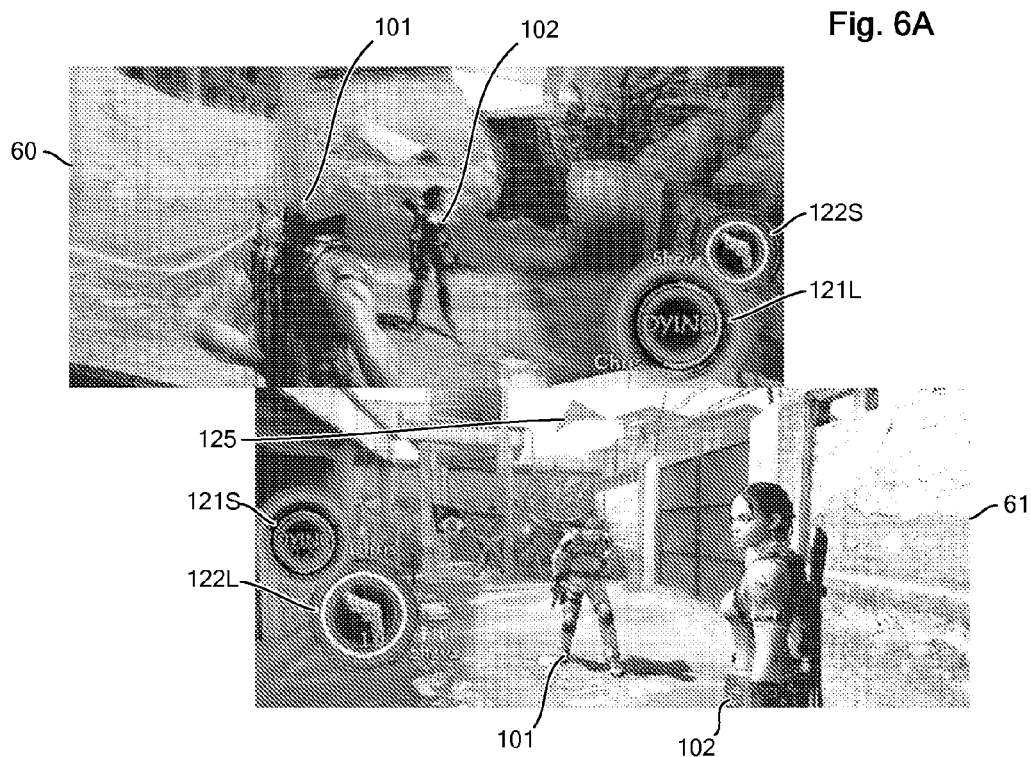
FIGS. 6A and 6B illustrate game images of an action game executed by the game device.

FIG. 6A illustrates a game image after a few seconds since the player character A has entered the weakened state. The virtual camera image of the player character A is filtered in red and distorted, which presents a state that the player character A is semiconscious. In addition, the user's operations for the player character A other than movement operation are refused, and the moving speed of the player character A is much slower than the normal state.

The enemy character 110 (not shown in FIG. 6A) does not attack the player character A with no hit point for a predetermined length of time (e.g., 5 seconds). That is, the enemy character 110 observes the player character A, for a while, to determine whether the player character A has died. Because the player character A is alive in the weakened state, the enemy character 110 resumes to attack the player character A after the predetermined length of time. The time for the player character A to escape from the enemy character 110 is secured from this predetermined length of time.

Then, the red bar 130 of the hit point gauge 121 for the player character A is reduced in the counterclockwise direction as the time elapses. This is because the hit point in the weakened state can only be maintained for certain recovery energy (e.g., 30 seconds), and the red bar indicates the remaining recovery energy (remaining time). When the recovery energy reaches zero (when a recoverable time has elapsed) without being recovered (without a recovery action by the partner's player character), the player character A in the weakened state dies, and the game ends (see FIG. 8). The user (player character B), who attempts the recovery action (treatment), can determine the urgency in time and head to the rescue based to the display of the hit point gauge 121S for the player character A on his game image.

Figure 6B:
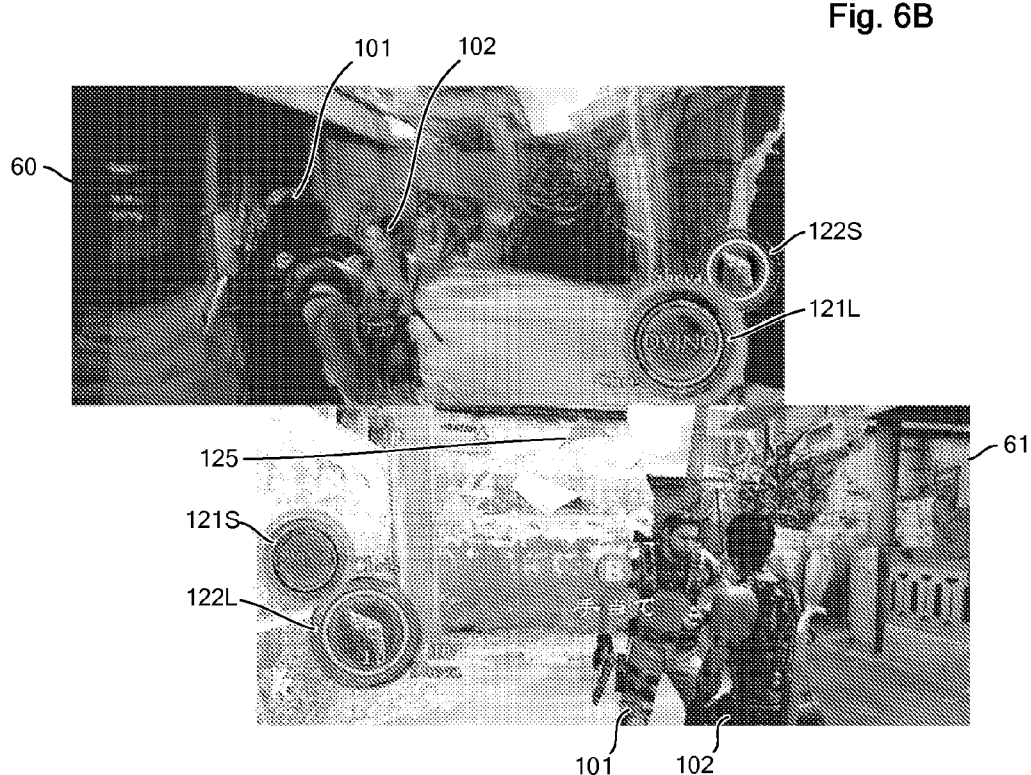

FIG. 6B illustrates a game image of a scene, in which the player character B approaches the player character A for a recovery action (treatment). When the player character B heads to rescue the player character A based on the arrow 125 on the game image and approaches the player character A within the time with the remaining recovery energy, a guidance for a "手当て" ("Treatment") with a button operation is displayed in the game image 71 of the player character B.

Figure 7A:
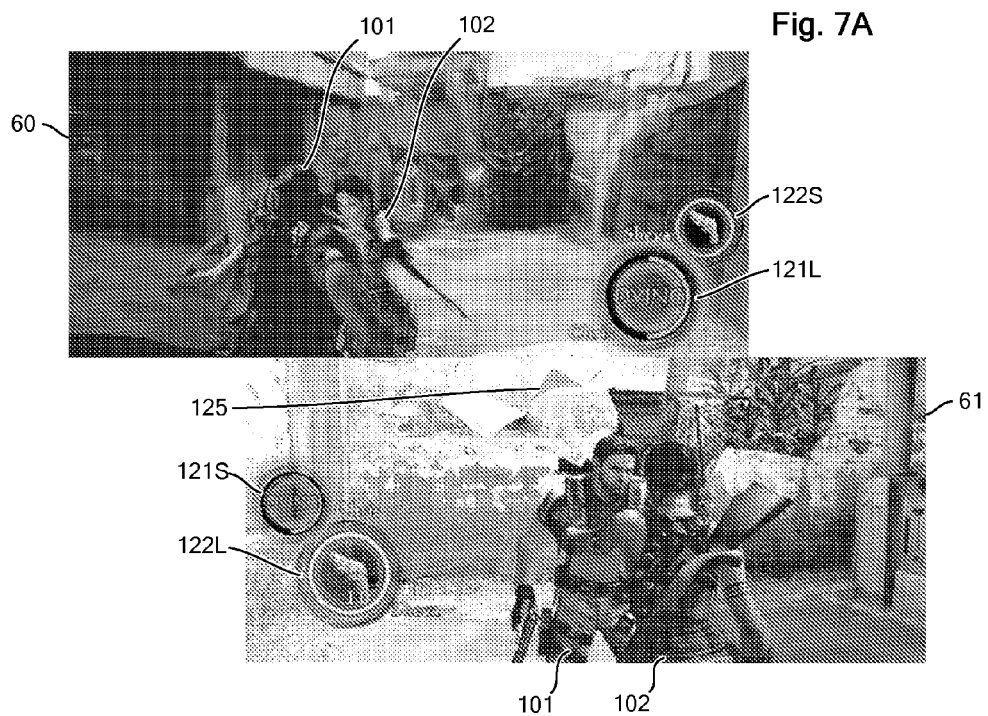
FIGS. 7A and 7B illustrate game images of an action game executed by the game device.

FIG. 7A illustrates a game image of a scene, in which the player character B is performing the recovery action (treatment) on the player character A. When the user of the player character B operates the controller 20 based on the guidance, the player character B touches the body of the player character A to perform the treatment. The recovery action (treatment) is not limited to normal recovery actions that are performed based on the displayed guidance but may be performed by use of a recovery item possessed by the player character B on the player character A. If the recovery action is performed by use of an item, the player character A can be recovered quickly by receiving more hit points than the normal recovery action. The recovery action by use of an item corresponds to "a recovery action including a specific action" of the present invention.

Figure 7B:
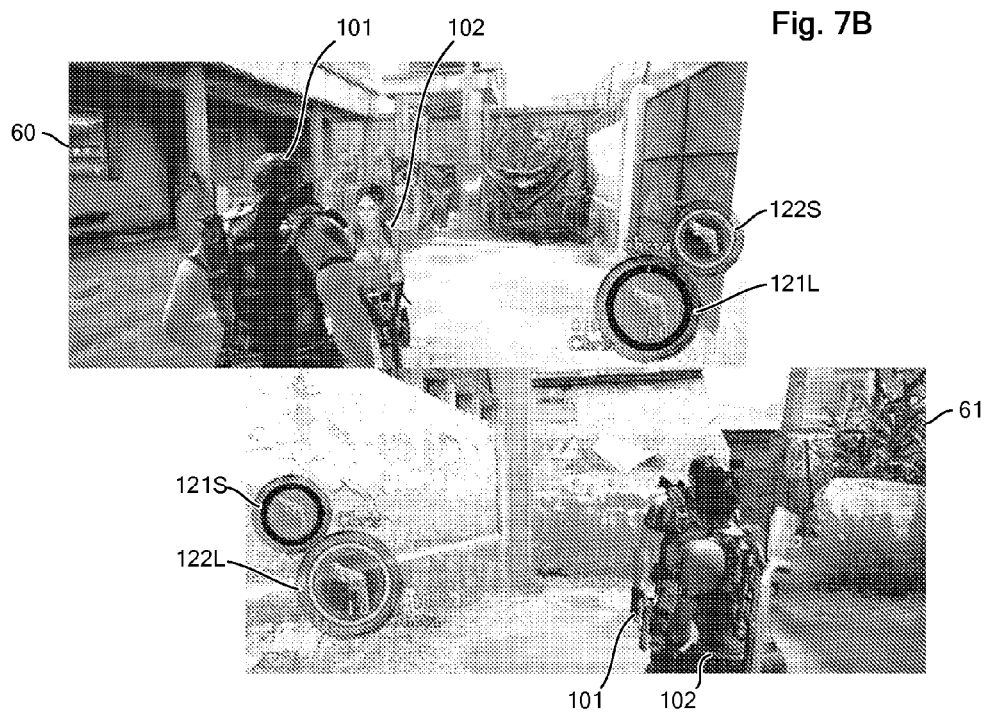

FIG. 7B illustrates a game image of a scene, in which the player character A has recovered as a result of the recovery action by the player character B. The player character A recovers from the weakened state as the player character B performs the recovery action based on the displayed guidance. As a result, the game image of the player character A returns to a normal image, and the bar 130 of the hit point gauge 121 for the player character A returns from a red bar, which is reduced by time, to a green bar indicating a small hit point. The reason that the player character A gets only the small hit point is that the small hit point is considered sufficient to avoid the dangerous condition of the weakened state. The restriction in the weakened state, which is only to move, is released, and the player character A can perform any entire normal activities. Therefore, more hit points may be obtained if the player character A possesses and uses a recovery item.

The game image of the player character B also returns to a normal image, and the arrow 125 that indicates the position of the player character A disappears. Moreover, the word "DYING" in the image display part 131 of the hit point gauge 121S for the player character A disappears, and the hit point gauge 121S returns to a green gauge with a small hit point. The player character B is not affected negatively by performing the recovery action (treatment), such as reducing his hit point. However, when the player character B recovers another player character on the team by using his item, the item is, of course, consumed.

Figure 8:
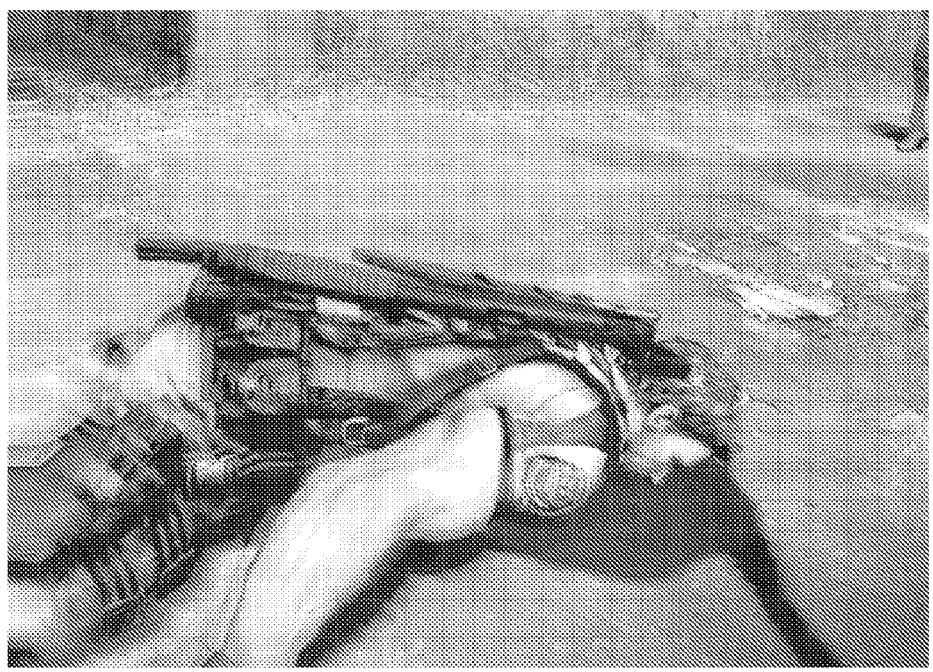
FIG. 8 illustrates a game image of an action game executed by the game device.

FIG. 8 illustrates a game image that is displayed when the player character A dies. If the player character A receives additional damages from an enemy character while in the weakened state, or if the recoverable time has elapsed in the weakened state without being recovered, the character A dies. Because the game ends when one of the player characters A and B is caused to die as discussed above, the game ends as soon as the player character A dies. Although the game images are displayed in the image area set respectively for the player characters A and B during the progress of the game, as soon as one of the player characters (in this case, player character A) dies, only a game image that shows a dead player character on the ground is displayed, and the game ends when an indication that the game is over is displayed.

Figure 9:
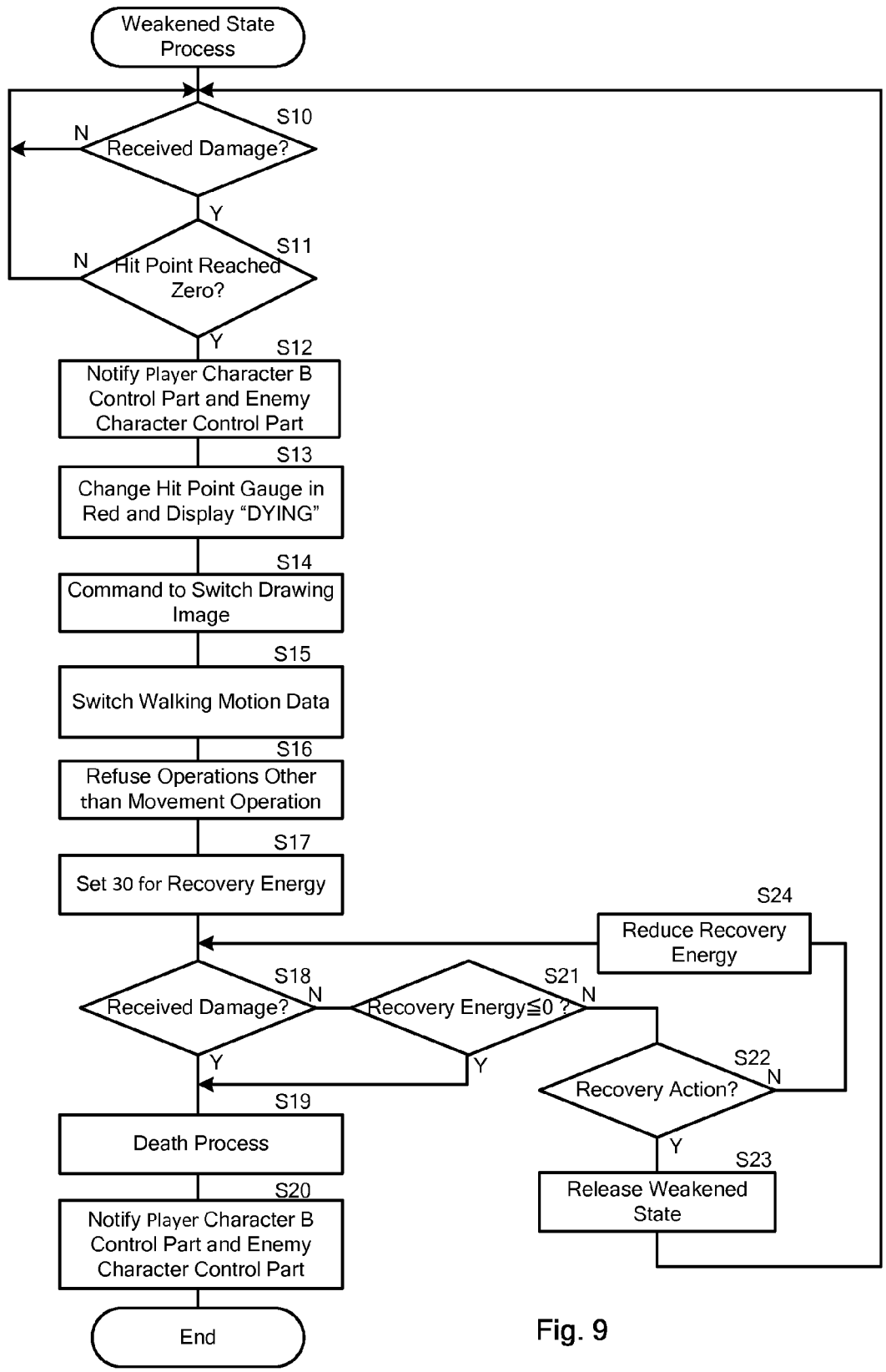
FIG. 9 illustrates a flow diagram showing an operation of the game device.

Operations of the above-discussed game device are explained with reference to flow diagrams in FIGS. 9-12. FIG. 9 is a flow diagram showing a process by the player character A control part 54 in the situations shown in FIGS. 5-8. First, the player character A control part 54 determines whether or not the player character A received damage from an attack by an enemy character or the like (S10). If damage has been received (Yes, S10), the player character A control part 54 determines whether or not the hit point of the player character A has reached zero (S11). If the hit point has reached zero (Yes, S11), the player character A control part 54 notifies the player character B control part 55, which controls the player character B, and the enemy character control part 53, which controls the enemy character, that the hit point of the player character A has reached zero (S12), and the below process is performed to place the player character A in a weakened state.

The player character A control part 54 first sends a command to the gauge drawing part 59 to change the color of the bar 130 of the hit point gauge 121 from green to red and to display the word "DYING" in the information display part 131 in the center of the hit point gauge 121 (S13). At the same time, the player character A control part 54 sends a command to the player character A image drawing part 58 to apply a red filter on the entire image of a virtual camera and to distort the image (S14).

Next, the player character A control part 54 switches motion data that controls the walking of the player character A to motion data for the weakened state (S15). More specifically, the motion data is replaced by motion data for slow wobbling. In addition, the player character A control part 54 accepts only a moving operation among operations inputted by the user and refuses other operations (attacks, use of items, etc.) (S16). As a result, the player character A is allowed to recover from the weakened state only by the recovery action by the partner's player character B.

The player character A control part 54 sets "thirty (30)" for the recovery energy for the player character A (energy to maintain the weakened state for 30 seconds) (S17) and determines whether or not the player character A received damage by an enemy character (S18) and whether or not the recovery energy has reached zero (S21). If the player character A has received damage (from an enemy character) (Yes, S18) or if the recovery energy of the player character A has reached zero (Yes, S21), the player character A control part 54 performs a death process for the player character A (S19) and notifies the players character B control part 55 and the enemy character control part 53 that the player character A has died (S20), and the game ends. At this time, not only the game of the dead player character A but also the game of the co-playing player character B end.

Figure 11:
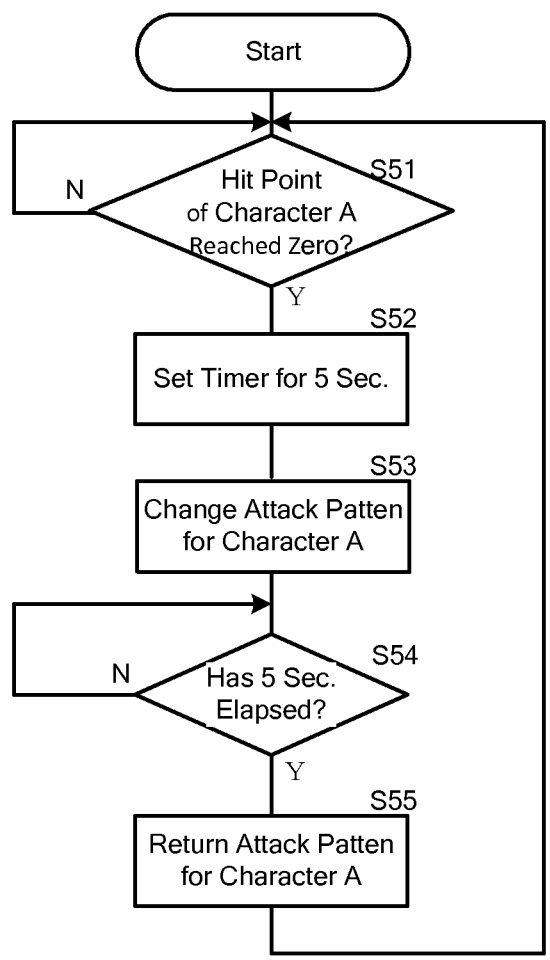
FIG. 11 illustrates a flow diagram showing an operation of the game device.

The enemy character is configured so that it does not attack the player character A for 5 seconds after the hit point of the player character A has reached zero (see FIG. 11).

If the player character A does not receive damage (No, S18), and if there is remaining recovery energy (No, S21), the player character A control part 54 determines whether or not a recovery action has been performed by the player character B (S22). If a recovery action has been performed by the player character B (Yes, S22), the player character A control part 54 releases a weakened state (S23). The releasing of the weakened state is a process to increase the hit point of the player character A by a certain amount, to return the display of game image including the hit point gauge to a normal image, to release the input restriction of the user operation, and the like. The player character A control part 54 switches the game image and moving operation to the normal state, and the process returns to the damage determination (S10).

If there has not been a recovery action by the player character B (No, S22), the player character A control part 54 reduces the recovery energy of the player character A (S24), and the process returns to the determination of damage (S18) and to the determination as to whether or not the recovery energy has become zero or less (S21). The result of reduction of the recovery energy at S24 is notified from the player character A control part 54 to the gauge drawing parts 59 and 62 of the drawing processing part 57. Based on the reduction, the red bar 130 in the hit point gauges 121L and 121S that are displayed in the game images 70 and 71 are updated so that the bar 130 is shortened.

Figure 10:
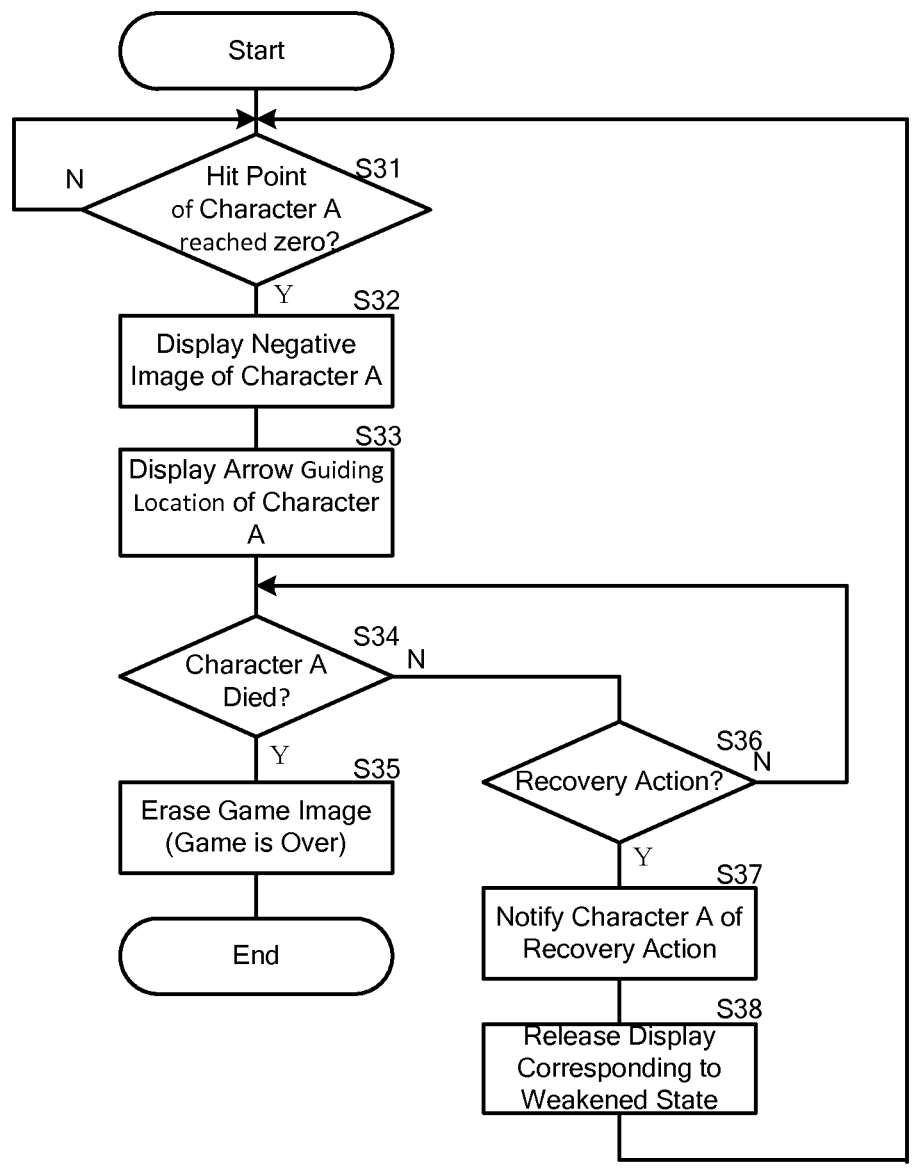
FIG. 10 illustrates a flow diagram showing an operation of the game device.

FIG. 10 is a flow diagram showing a process by the player character B control part 55 in the situations shown in FIGS. 5-8. The player character B control part 55 first determines whether or not the hit point of the player character A has reached zero (S31). If the hit point of the player character has reached zero (Yes, S31), the player character B control part 55 performs the below image changing process.

The player character B control part 55 first sends a command to the player character B image drawing part 61 to momentarily display an image of a virtual camera for the player character A that is reversed into a negative image (S32). At the same time, the player character B control part 55 sends a command to the player character B image drawing part 61 to display the arrow 125 that guides the position of the player character A (S33). The guide arrow 125 is displayed as the player character B control part 55 receives the positional information of the player character A from the player character A control part 54. Based on the process of the above-discussed S24, the display of the hit point gauge 121S in the game image 71 is also changed in parallel.

After this, the player character B control part 55 determines whether or not the player character A has died (S34) and whether or not a recovery operation by a control of the user's controller 20 (recovery action by the player character B; see FIGS. 6B and 7A) has been performed (S36).

If the recovery action has been performed (Yes, S36), the player character B control part 55 notifies the player character A control part 54 of the recovery action (S37) and releases the display corresponding to the weakened state of the player character A (e.g., S33), such as removing the display of the arrow 125 based on the weakened state of the player character A (S38). Then, the process returns to the determination of the hit point of the player character A (S31).

On the other hand, if the player character A has died (Yes, S34), because the image showing the death of the player character A is displayed at full screen, the player character B control part 55 erases the game image of the player character B (S35). The game ends thereafter.

FIG. 11 is a flow diagram showing a process by the enemy character control part 53 in the situations shown in FIGS. 5-8. First, the enemy character control part 53 determines whether or not the hit point of the player character A is zero (S51). If the hit point of the player character A is zero (Yes, S51), the enemy character control part 53 sets a timer for 5 seconds (S52) and changes an attack pattern for the player character A in the weakened state (S53). More specifically, the attack pattern is changed to avoid attacking and to simply follow and watch the player character A in the weakened state. After 5 seconds are elapsed (Yes, S54), the enemy character control part 53 returns the attack pattern for the player character A in the weakened state to the normal attack pattern (S55). As a result, the enemy character can attack the player character A in the weakened state thereafter.

In the process by the player character A control part 54 shown in FIG. 9, the recovery energy of the player character A always starts from 30 when the player character enters the weakened state. In addition, the player character A is configured to immediately die if the player character A receives an attack from an enemy character when the player character A is in the weakened state. However, processes shown in FIGS. 12A and 12B are also possible instead.

Figure 12A:
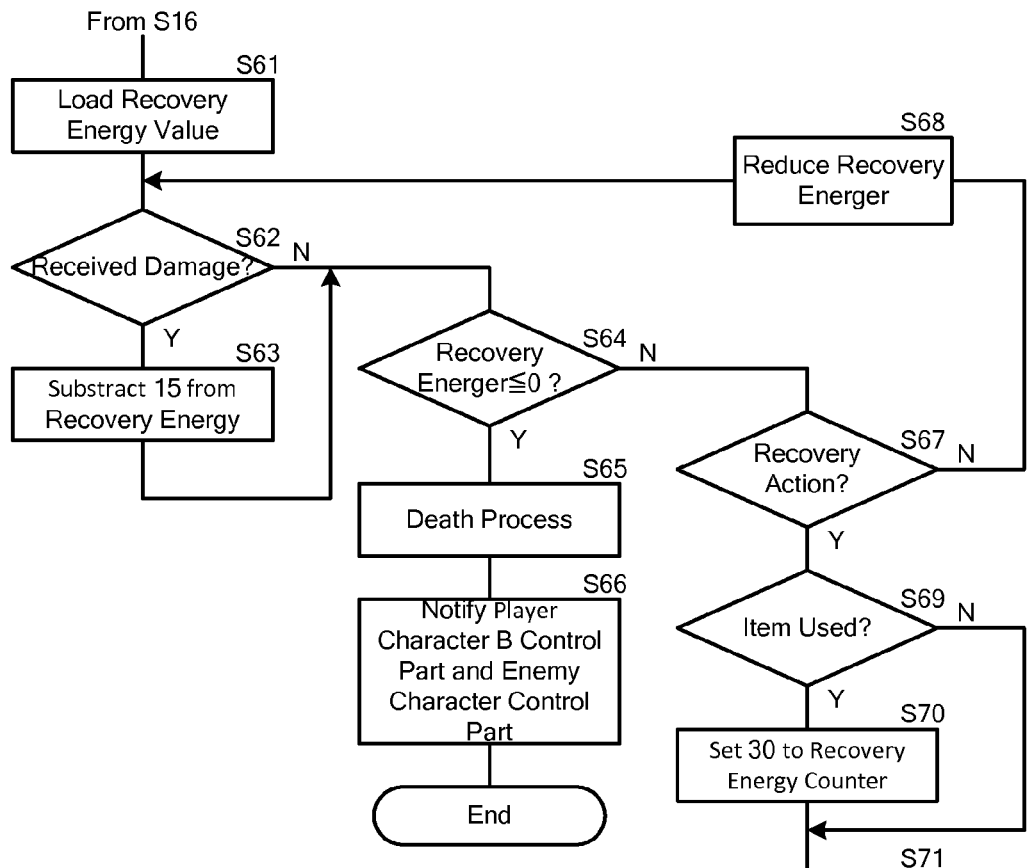
FIGS. 12A and 12B illustrate flow diagrams showing an operation of the game device.
Figure 12B:
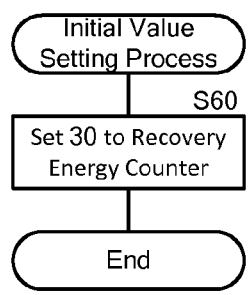

In the processes shown in FIGS. 12A and 12B, the default recovery energy of the player character A is 30. However, the recovery energy after the second time starts from the remaining recovery energy in the previous weakened state, resulting a more difficult recovery. However, if the player character A recovered by a recovery action using a recovery item in the previous weakened state, the recovery energy in the subsequent recovery state is made to return to 30. In addition, if the player character A in the weakened state is attacked by an enemy character, the player character A control part 54 does not cause the player character A to die immediately, but reduces the recovery energy by a predetermined value (e.g., 15) and determines whether or not the player character A is dead based on the remainder of the resultant recovery energy.

FIG. 12A illustrates a process that is executed instead of S17-S24 in FIG. 9. At S16 in FIG. 9, the player character A control part 54 is configured to accept only movement operations of the operation inputs by the user and refuse the other operations, and then performs the process after S61. First, the player character A control part 54 sets a recovery energy counter by loading a recovery energy value stored in a recovery energy value storage area of the RAM 32 (S61).

The player character A control part 54 then determines whether or not the player character A has received damage from an attack by an enemy character (S62), whether or not the recovery energy has reached zero (S64), and whether or not a recovery action has been performed by the player character B (S67). The player character A control part 54 continues to reduce the recovery energy (S68) and waits until any one of the above determinations is made. Based on the reduction of the recovery energy, the red bar 130 of the hit point gauge displayed in the game image is updated to be shortened.

If the player character A has received damage from the enemy character (Yes, S62), the player character A control part 54 subtracts "fifteen (15)" from the recovery energy (S63), and process moves to S64. If the recovery energy of the player character A reaches zero after elapsing time or by damage from an enemy character (Yes, S64), the player character A control part 54 performs a death process on the player character A (S65) and notifies the player character B control part 55 and the enemy character control part 53 that the player character A is dead (S66). The game then ends.

If a recovery action has been taken by the player character B (Yes, S67), the player character A control part 54 determines whether a recovery item was used in this recovery action (S69). If a recovery item was used in the recovery action (Yes, S69), the player character A control part 54 sets "thirty (30)" to the recovery energy counter (S70), and the process moves to S71. If a recovery item was not used in the recovery action (No, S69), the process skips S70 and jumps to S71. At S71, the player character A control part 54 saves a recovery energy value of the recovery energy counter in the recovery energy value storage area (S71) and releases the weakened state of the player character A (S72). This process of releasing the weakened state increases the hit point of the player character A by a certain value, returns the display of the game image including the hit point to a normal display, and releases the restriction in accepting the user operation. The process returns to the damage determination at S10 thereafter.

In the case of a type shown in FIG. 12A that subtracts the recovery energy, an initial value needs to be set for the recovery energy. FIG. 12B illustrates an initial value setting process that sets the initial value for the recovery energy. This process is executed by the player character A control part 54 when the game starts and sets 30 to the recovery energy counter (S60).

In this embodiment, the explanations are made for the case, in which the player character A falls in a weakened state, and in which the player character B performs a recovery action. However, the character in the weakened state and the character to perform the recovery action may be switched. In addition, the number of player characters in the game is not limited to two. Moreover, any player character may fall in the weakened state, and any player character may perform the recovery action. In that case, the processes relating to the player character in the weakened state and the processes relating to the player character performing the recovery action are the same as above.

Further, the game images shown in FIGS. 5A-8 illustrate scenes, in which the player character A enters a weakened state as a result of an attack by an enemy character. However, the present invention is applicable in a case in which the hit point becomes zero by damage from an attack by a non-enemy character, such as self-destruction by the player character and an attack from a partner's player character.

Furthermore, in the above-described embodiment, the explanations are made for the case, in which only the player character A falls in a weakened state. However, if both of the player characters A and B fall in the weakened state, because there would be no player characters that can perform a recovery action, and thereby because the player characters can no longer be recovered, the game progress control part 51 terminates the game immediately without waiting for the recoverable time to elapse. This is similar for the case with three or more player characters. If all of the player characters are dead or fall in the weakened state, the game progress control part 51 terminates the game at that time.

In addition, in this embodiment, the process sets recovery energy for the player character in the weakened state and reduces the recovery energy to provide a recoverable time of 30 seconds. However, a recoverable time (30 seconds) may be directly set, which is timed by a timer to measure the recoverable time.

In this embodiment, as an example, the explanations are made with a player character that performs activities as a human in the game as a player object. However, the player object of the present invention is not limited to humans but may be non-human beings and machines, such as robots, fighter jets and tanks, that perform activities in the game space.

In the above-described embodiment, the explanations are made with a configuration, in which multiple (2) controllers 20 are connected to a single game machine main body 10 to perform motion controls for the player characters A and B by the respective controllers 20. However, the present invention is not limited to this configuration. For example, a part of the multiple players may be operated by a CPU (artificial intelligence; AI) of the game device. Moreover, the present invention is applicable in a game system in which a plurality of game devices is connected through a network or the like.

Figure 13:
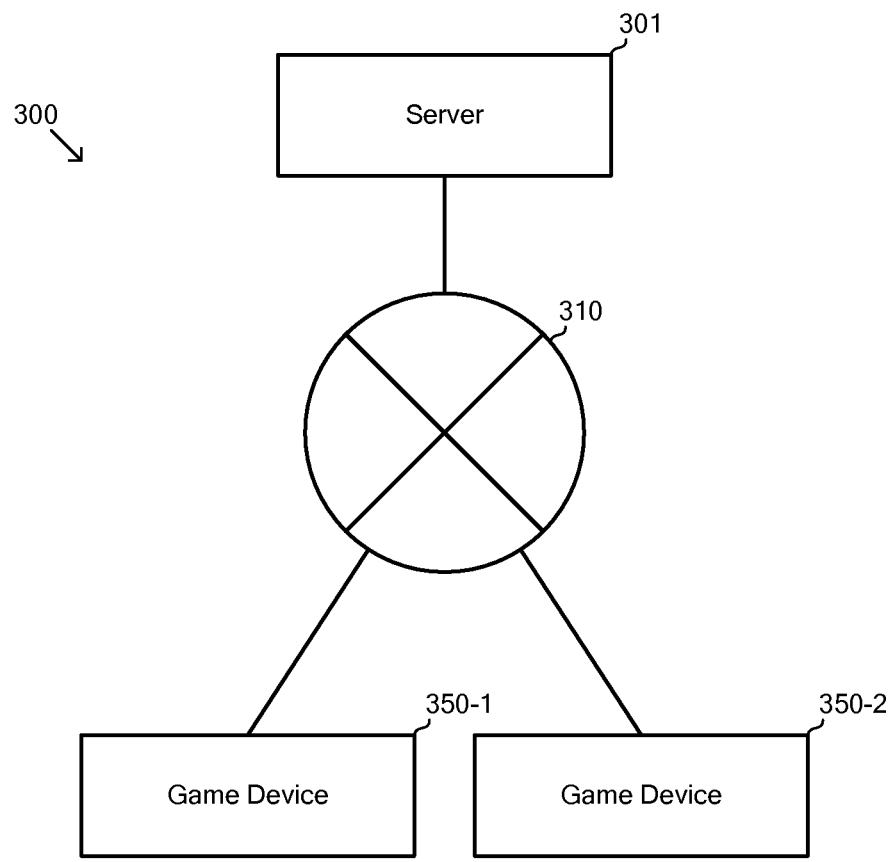
FIG. 13 illustrates a game system formed by connecting a plurality of game devices through a network.

FIG. 13 is a schematic structural diagram showing a game system 300, in which a server device 301 and two game devices 350-1 and 350-2 are connected to each other through a network 310. Similar to the above-described video game machine, each of the game devices 350-1 and 350-2 includes at least one controller connected thereto and a display that displays the game image.

In this game system, the player character A is operated by the game device 350-1 (with controller), and the player character B is operated by the game device 350-2 (with controller). The operational information of the player character A inputted to the game device 350-1 controls the motion of the player character A in the game executed by the game device 350-1. In addition, the operational information of the player character A is transmitted to the game device 350-2 through the network 310 and via the game server 301 and also controls the motion of the player character A in the game executed by the game device 350-2.

Similarly, the operational information of the player character B inputted to the game device 350-2 controls the motion of the player character B in the game executed by the game device 350-2. In addition, the operational information of the player character B is transmitted to the game device 350-1 through the network 310 and via the game server 301 and also controls the motion of the player character B in the game executed by the game device 350-1. The display of each game device displays a game image corresponding to the controlled player character at full screen.

This example is explained based on a case of two player characters. With three or more player characters, the number of game devices 350 that corresponds to the number of player characters may be connected to each other through the network 310, and the player characters may be controlled by the respective game devices 350.

Moreover, in the above-described example, the operational information of the player characters is exchanged via the server device 301. However, the game devices may directly communicate using a technology such as peer-to-peer.

INDUSTRIAL USABILITY

The present invention may be used in industrial fields for manufacturing and selling arcade and consumer games.

What we claim is:

1. A game program, which is stored in a non-transitory computer readable storage medium, driving a computer to function as:
   a game space control unit for generating a virtual game space;
   a player object control unit for generating a player object in the game space and for causing the player object to perform an activity in the game space based on operational information; and
   an enemy object control unit for generating an enemy object that fights with the player object and for causing the enemy object to perform an activity in the game space, wherein
   a plurality of the player object control units is provided to cause different player objects respectively corresponding thereto to perform activities in the game space,
   each of the player object control units includes:
      a unit for storing an activity ability value that indicates activity ability of a corresponding player object;

an activity ability value control unit for reducing the activity ability value when the corresponding player object receives an attack from the enemy object;

a unit for maintaining the activity by the corresponding player object for a predetermined recoverable time as a recovery wait state and for accepting a predetermined recovery action from another player object during the recoverable time when the activity ability value of the corresponding player object is reduced to a predetermined value; and a unit for performing a death process to the corresponding player object when the recovery action is not performed by the another player object during the recoverable time, the enemy object control unit controls the enemy object not to attack a player object in the recovery wait state during at least a first part of the recoverable time, and when the corresponding player object in the recovery wait state receives the recovery action from the another player object, the player object control unit sets a remainder of the recoverable time at that time as the predeterminded recoverable time of a subsequent recovery wait state.

2. A game device, comprising:
a non-transitory program store part for storing a game program according to claim 1; and
a computer for executing a game program stored in the program store part.

3. A game program, which is stored in a non-transitory computer readable storage medium, driving a computer to function as:

a game space control unit for generating a virtual game space;

a player object control unit for generating a player object in the game space and for causing the player object to perform an activity in the game space based on operational information; and an enemy object control unit for generating an enemy object that fights with the player object and for causing the enemy object to perform an activity in the game space, wherein a plurality of the player object control units is provided to cause different player objects respectively corresponding thereto to perform activities in the game space, each of the player object control units includes:
a unit for storing an activity ability value that indicates activity ability of a corresponding player object;
an activity ability value control unit for reducing the activity ability value when the corresponding player object receives an attack from the enemy object;
a unit for maintaining the activity by the corresponding player object for a predetermined recoverable time as a recovery wait state and for accepting a predetermined recovery action from another player object during the recoverable time when the activity ability value of the corresponding player object is reduced to a predetermined value;
a unit for performing a death process to the corresponding player object when the recovery action is not performed by the another player object during the recoverable time, the enemy object control unit controls the enemy object not to attack a player object in the recovery wait state during at least a first part of the recoverable time, and when the corresponding player object in the recovery wait state receives a recovery action including a specific action from the another player object, the player object control unit sets the predetermined recoverable time of a subsequent recovery wait state as a preset maximum recoverable time.

4. A game device, comprising:
a non-transitory program store part for storing a game program according to claim 3; and
a computer for executing a game program stored in the program store part.

5. A game program, which is stored in a non-transitory computer readable storage medium, driving a computer to function as:

a game space control unit for generating a virtual game space;

a player object control unit for generating a player object in the game space and for causing the player object to perform an activity in the game space based on operational information; and an enemy object control unit for generating an enemy object that fights with the player object and for causing the enemy object to perform an activity in the game space, wherein a plurality of the player object control units is provided to cause different player objects respectively corresponding thereto to perform activities in the game space, each of the player object control units includes:
a unit for storing an activity ability value that indicates activity ability of a corresponding player object;
an activity ability value control unit for reducing the activity ability value when the corresponding player object receives an attack from the enemy object;
a unit for maintaining the activity by the corresponding player object for a predetermined recoverable time as a recovery wait state and for accepting a predetermined recovery action from another player object during the recoverable time when the activity ability value of the corresponding player object is reduced to a predetermined value;
a unit for performing a death process to the corresponding player object when the recovery action is not performed by the another player object during the recoverable time, the enemy object control unit controls the enemy object not to attack a player object in the recovery wait state during at least a first part of the recoverable time, the computer is driven to further function as one or a plurality of game image drawing units for generating one or a plurality of the game screens corresponding a part of or the entire plurality of the player objects, and each of the game image drawing units includes a unit for generating an image of the game space including the corresponding player object and for generating a dedicated game screen different from a normal one when the corresponding player object enters the recovery wait state.

6. A game device, comprising:
a non-transitory program store part for storing a game program according to claim 5; and
a computer for executing a game program stored in the program store part.

7. A game program, which is stored in a non-transitory computer readable storage medium, driving a computer to function as:
a game space control unit for generating a virtual game space;

a player object control unit for generating a player object in the game space and for causing the player object to perform an activity in the game space based on operational information; and an enemy object control unit for generating an enemy object that fights with the player object and for causing the enemy object to perform an activity in the game space, wherein a plurality of the player object control units is provided to cause different player objects respectively corresponding thereto to perform activities in the game space, each of the player object control units includes:
  a unit for storing an activity ability value that indicates activity ability of a corresponding player object;
  an activity ability value control unit for reducing the activity ability value when the corresponding player object receives an attack from the enemy object;
  a unit for maintaining the activity by the corresponding player object for a predetermined recoverable time as a recovery wait state and for accepting a predetermined recovery action from another player object during the recoverable time when the activity ability value of the corresponding player object is reduced to a predetermined value;
  a unit for performing a death process to the corresponding player object when the recovery action is not performed by the another player object during the recoverable time, the enemy object control unit controls the enemy object not to attack a player object in the recovery wait state during at least a first part of the recoverable time, the computer is driven to further function as one or a plurality of game image drawing units for generating one or a plurality of the game screens corresponding a part of or the entire plurality of the player objects, and when the another player object enters the recovery wait state, each of the game image drawing units performs a process for showing the state on at least a part of the corresponding game screen.

8. A game device, comprising:

a non-transitory program store part for storing a game program according to claim 7; and a computer for executing a game program stored in the program store part.

\* \* \* \* \*